US007005483B2

(12) United States Patent
Chang et al.

(10) Patent No.: US 7,005,483 B2
(45) Date of Patent: Feb. 28, 2006

(54) EPOXY EBONITE COMPOSITIONS

(75) Inventors: Rong Jong Chang, Fremont, CA (US);
Edita Rojasova, Cupertino, CA (US);
Linas Mazeika, San Carlos, CA (US)

(73) Assignee: 3L & T, Inc., Mountain View, CA (US)

( * ) Notice: Subject to any disclaimer, the term of this patent is extended or adjusted under 35 U.S.C. 154(b) by 29 days.

(21) Appl. No.: 10/387,140

(22) Filed: Mar. 11, 2003

(65) Prior Publication Data
US 2004/0143037 A1  Jul. 22, 2004

Related U.S. Application Data

(60) Provisional application No. 60/441,075, filed on Jan. 17, 2003.

(51) Int. Cl.
*C08L 63/00* (2006.01)
(52) U.S. Cl. .................. 525/523; 525/107; 525/113; 525/529; 523/400; 523/453
(58) Field of Classification Search ............ 525/107, 525/113, 523, 529; 523/400, 440, 443
See application file for complete search history.

(56) References Cited

U.S. PATENT DOCUMENTS

| 4,153,740 A | 5/1979 | Smith et al. ................ 427/8 |
| 4,389,501 A | 6/1983 | Burris ..................... 523/400 |
| 4,921,912 A | 5/1990 | Sagawa et al. ............ 525/112 |
| 5,766,687 A | 6/1998 | Rappoport ................ 427/386 |
| 5,997,953 A | 12/1999 | Rappoport ................ 427/386 |
| 6,303,683 B1 | 10/2001 | Figovsky .................. 524/495 |
| 6,482,894 B1 | 11/2002 | Chang et al. ............. 525/191 |
| 6,486,259 B1 * | 11/2002 | Betts et al. ............... 525/192 |
| 2002/0002244 A1 | 1/2002 | Hoelter et al. ............ 525/107 |

FOREIGN PATENT DOCUMENTS

| DE | 3740181 | 6/1989 |
| WO | WO00/06639 | 2/2000 |

OTHER PUBLICATIONS

Charles G. Munger et al.,"Coatings and Linings for Immersion Service," TPC Publication 2, Revised Edition, NACE International, 1998, Houston, Texas.
Charles G. Munger et al., "Corrosion Protection by Protective Coatings," Second Edition, National Association of Corrosion Engineers, Published in 1999.

* cited by examiner

*Primary Examiner*—Michael J. Feely
(74) *Attorney, Agent, or Firm*—Lumen Intellectual Property Services, Inc.

(57) ABSTRACT

Overall, ebonite coatings or elastomeric linings are not recommended for direct immersion in sulfuric acid with higher than 65% concentration. By blending a chemical resistant epoxy resin to an ebonite coating, the resulting epoxy ebonite composition can be employed in more severe environment such as direct immersion in >65% sulfuric acid. In particular, the present invention provides a blend of an epoxy coating with an ebonite coating with a mix ratio of 95/5 to 5/95, the resulting epoxy ebonite composition of which has greatly increased adhesion to steel and excellent resistance to undercut corrosion when subjected to salt spray. The epoxy ebonite composition according to the present invention can be used as coatings, adhesives, encapsulants or sealants and is particularly useful as industrial coatings that are subject to wide temperature variations, salt contamination or chemical attack.

5 Claims, No Drawings

EPOXY EBONITE COMPOSITIONS

CROSS-REFERENCE TO RELATED APPLICATIONS

This application relates a U.S. provisional patent application No. 60/441,075, filed Jan. 17, 2003 and titled "CHEMICAL RESISTANT EPOXY COMPOSITION".

FIELD OF THE INVENTION

This invention generally relates to epoxy ebonite blends and, more particularly, to an epoxy ebonite composition resulted from a blend of an epoxy coating with an ebonite coating, the composition of which can be used as coatings, adhesive, encapsulants, or sealants, and of which is particularly useful as industrial coatings which are subject to wide temperature variations, salt contamination, corrosion, chemical attack, or the like.

DESCRIPTION OF THE BACKGROUND ART

Epoxy resin is one of the most widely used coatings for protecting steel due to its excellent chemical, corrosion resistance and versatility. Epoxy coatings can be formulated with a wide variety of starting resins such as Bisphenol A, Bisphenol F, Novolac Epoxy, and phenolic as well as a wide selection of curing agents such as polyamide amines, aliphatic amines, cycloaliphatic amines, aromatic amines and anhydrides. Also, epoxy coatings are available in liquid as well as in powder forms. An excellent summary of using epoxy protective coatings can be found in "Corrosion Prevention by Protective Coatings," Chapter 5, Second Edition, by Charles Munger, published by the National Association of Corrosion Engineers (NACE).

The adhesion of epoxy resin to steel, while depending on the selection of curing agents, is generally satisfactory if the service temperature does not vary too much. However, it is well known in the coating industry that epoxy resins are prone to interfacial delamination which prevents it from many applications where there is a significant temperature cycling. Moreover, epoxy has low resistance to undercut corrosion. This means that if corrosion is initiated somewhere in the coating due to imperfection such as pin holes or holidays, the corrosion will quickly spread underneath the well coated areas where excellent adhesion between the epoxy and steel was originally achieved.

On the other hand, liquid ebonite has also been disclosed as monolithic protective coating to replace hard-rubber (or elastomer) sheet linings to protect steel. For prior art teachings on liquid ebonite coatings, readers are referred to U.S. Pat. Nos. 5,766,687 and 5,997,953, both by Rappoport, WO 0,006,639 by Figovsky, DE 3,740,181 by Petrovic et al., U.S. Pat. No. 6,482,894 by Chang et al., and U.S. patent application 2002/0002244 by Hoelter et al.

Ebonite coatings exhibit several outstanding properties including excellent adhesion to steel, resistance to delamination due to temperature cycling, and chemical resistance to a wide range of chemicals similar to their elastomeric sheet lining counterparts. A summary of the chemical resistance of elastomeric sheet linings can be found in "Coatings and Linings for Immersion Service, Revised Edition," Chapter 9: Elastomeric Linings, published by NACE. Overall, ebonite coatings or elastomeric linings are not recommended for direct immersion in sulfuric acid with higher than 65% concentration. This restricts the applications of ebonite coatings to less severe conditions.

A liquid ebonite composition contains at least four major ingredients: liquid rubber, elemental sulfur, vulcanization accelerator, and vulcanization activator. There exist prior art compositions consisting of a blend of epoxy with liquid rubber alone, or of a blend of epoxy with sulfur or sulfur containing organic chemicals alone. For example, it is well known and widely practiced in the art to toughening an epoxy with a compatible liquid rubber. As described in U.S. Pat. No. 4,921,912, such composition provides improved physical properties such as peel adhesion, impact strength. However, there is no mention of corrosion resistance.

Blending an epoxy with sulfur or sulfur containing organic chemicals alone is also well known. For example, U.S. Pat. No. 4,389,501, disclosed that by adding elemental sulfur to an epoxy composition, the cure rate of the epoxy was accelerated. However, there was no mention of effect on adhesion or resistance to undercut corrosion. U.S. Pat. No. 4,153,740, disclosed an organo-sulfur compound such as thiuram, sulfenamide, or benzothizole in a resinous carrier including epoxy as a coating on the electrical wire for detecting wire overheating. All the organo-sulfur compounds disclosed therein can be used as a vulcanization accelerator. This prior art composition thus contained an epoxy and a vulcanization accelerator, but not liquid rubber, elemental sulfur, and vulcanization activator that are required in an ebonite composition.

These prior art teachings do not teach or suggest an epoxy composition that contains the four essential ingredients of a liquid ebonite composition, namely, liquid rubber, elemental sulfur, vulcanization accelerator, and vulcanization activator. Furthermore, none of the aforementioned prior art references teach or suggest a versatile, practical, and effective coating composition that has improved resistance to undercut corrosion.

SUMMARY OF THE INVENTION

Overall, ebonite coatings or elastomeric linings are not recommended for direct immersion in sulfuric acid with higher than 65% concentration. This restricts the applications of ebonite coatings to less severe conditions. According to one important aspect of the present invention, we have found that the addition of liquid ebonite or hard-rubber as a minor ingredient to the epoxy formulations greatly improves the resistance to delamination and undercut corrosion of epoxy resins. By blending an chemical resistant epoxy resin to the ebonite coating, the resulting ebonite coatings can be employed in more severe environment such as direct immersion in >65% sulfuric acid.

In particular, we have discovered rather surprisingly that a blend of an epoxy coating with an ebonite coating with a mix ratio of 95/5 to 5/95, resulted in a composition which greatly increased the adhesion to steel and also exhibited excellent resistance to undercut corrosion when subjected to salt spray. The composition according to the present invention can be used as coatings, adhesives, encapsulants or sealants. The present invention is particularly useful as industrial coatings that are subject to wide temperature variations, salt contamination or chemical attack.

DETAILED DESCRIPTION OF THE INVENTION

The above-referenced provisional patent application No. 60/441,075, filed on Jan. 17, 2003 by the present inventors, disclosed an epoxy composition that exhibited exceptionally good chemical resistance. Specifically, the chemical resistant epoxy composition disclosed therein, which comprises epoxy resin of 100 parts by weight and precipitated silica of 5–65 parts, is highly resistant to chemical attack and can be advantageously used for short or long term direct, total, continuous, or intermittent immersion service, such as interior and exterior protective coatings, adhesives, encapsulants, or resin-fiber composites.

The present invention provides in one embodiment a new blend of an epoxy coating with an ebonite coating with a mix ratio of 95/5 to 5/95. The resulting composition has greatly increased adhesion to steel and excellent resistance to undercut corrosion when subjected to salt spray.

The blends of this invention start from two major components: Part A: a liquid ebonite composition and Part B: a high bake epoxy composition.

| Part A: Liquid ebonite composition | | |
|---|---|---|
| | Ingredient | Mass % |
| A-1 | Liquid rubber | 15–85 |
| | (a) Compatible liquid unsaturated rubber (>50% of A-1) | |
| | (b) Non-compatible liquid unsaturated rubber | |
| | (c) Liquid saturated rubber (<10% of A-1) | |
| A-2 | Sulfur vulcanization agent | 10–50 |
| A-3 | Vulcanization activator | 1–35 |
| A-4 | Vulcanization accelerator | 0.2–5 |
| A-5 | Carbon black | 1–10 |
| A-6 | Fillers | 0–5 |
| A-7 | Additives | 0–65 |
| A-8 | Crosslinker for A-1 | 0–35 |
| | Total | 100 |

| Part B: High bake epoxy composition | | |
|---|---|---|
| | Ingredient | Mass % |
| B-1 | Epoxy resin | 35–75 |
| B-2 | Silica | 0–25 |
| B-3 | Thixotropic Agent | 0–5 |
| B-4 | Pigments and fillers | 0–40 |
| B-5 | Epoxy curing agent | 12–65 |
| | Total | 100 |

The mix ratio of Part A/Part B is from 5/95 to 95/5 by mass. The mixing of Part A and Part B can be carried out just before the coating application, i.e., they can be supplied as a dual component system. Alternatively, Part A and Part B can be premixed and supplied as a single component coating. The composition of the blends according to the present invention contains at least six key ingredients: an epoxy resin, an epoxy curing agent, at least an unsaturated liquid rubber that is compatible with an epoxy, sulfur, a vulcanization accelerator and a vulcanization activator.

A-1 is selected from a mixture of liquid unsaturated rubbers that have different molecular mass or functional groups so long as they do not react to each other under ambient condition with the provision that at least 50% by mass of the mixture contains a liquid rubber that is compatible with the epoxy resin in Part B.

The liquid rubber (A-1) has the general formula of:

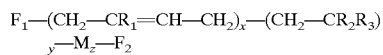

Where $R_1$=H, $CH_3$, Cl $R_2$, $R_3$=H, $CH_3$, $C_2H_5$, phenyl, nitrile, acrylate, acetate, vinyl, Cl, Br, etc.

$F_1$, $F_2$=H, $CH_3$, OH, COOH, $NH_2$, NCO, epoxy, vinyl, acrylate, methacrylate, anhydride, etc.

M is the third monomer, which can be Ethylidene norbornene, hexadiene or dicyclopentadiene, etc.

When $F_1$ and $F_2$ are either H or CH3, the liquid rubber is called non-functional. The liquid rubber can be linear which contains two chain ends, or branched which contains more than two chain ends or functional groups. The liquid rubber can also be partially epoxidized or maleinized through its double bonds.

Preferably, $5<x+y+z<150$, and, most preferably, $50<x+y+z<120$, so that the molecule is liquid at ambient temperature. The molecular mass of the liquid rubber can be from 200 to 10,000, preferably from 1000 to 8000, and, most preferably, from 2500 to 6000.

Also, at least 50% by mass of the total liquid rubber should be substantially unsaturated rubbers which have $x/(x+y+z)>0.5$ so that there are sufficient double bonds for sulfur vulcanization. The substantially unsaturated liquid rubbers can be polybutadiene, polyisoprene, poychloroprene, styrene butadiene copolymer, nitrile rubber (butadiene acrylonitrile copolymer), etc. Optionally, the liquid rubber can contain up to 10% by mass of substantially saturated liquid rubbers which have $x/(x+y+z)<0.1$ as modifier or compatibilizer. The substantially saturated liquid rubber can be butyl, chlorobutyl, bromobutyl, ethylene propylene copolymer, ethylene propylene diene copolymer, ethylene vinylacetate copolymer, acrylic rubber, etc.

Furthermore, at least 50% by mass of the total liquid rubber should be substantially compatible with the epoxy resin (B-1) in part B so that the final mixture does not show phase separation. The epoxy compatible liquid rubber can be epoxidized rubber, maleinized rubber, arylic functional rubber, chloroprene rubber, etc.

Some commercial liquid rubber can be utilized, including hydroxyl terminated polybutadiene Polybd 45HTLO and Polybd R-20 LM from Atofina, Liquiflex H and Liquiflex P from Petroflex, Krasol LBH from Kaucuk, hydroxyl terminated polyisoprene Poly IP from Atofina, isocyanate terminated polybutadiene Krasol LBD, Krasol NN, and Krasol NH from Kaucuk, maleinized polybutadiene Krasol LBM from Kaucuk, Ricon MA from Ricon Chemicals, epoxidized polybutadiene Polybd 600E, Polybd 605E and Polybd PRO 5052 from Atofina, nonfunctional polybutadiene Krasol LB, Krasol PS, Krasol PP from Kaucuk, Ricon from Ricon Chemicals, isolene polyisoprene and DPR liquid natural rubber from Elementis, Ricon copolymer for butadiene and styrene from Ricon Chemicals, acrylic terminated polybutadiene Ricacryl from Ricon Chemicals, etc.

A-2 can be rubber makers sulfur such as Redball Superfine supplied by International Sulfur or insoluble sulfur such as Crystex supplied by Flexsys, or their equivalents. Optionally, a portion of the sulfur can be replaced by an organic sulfur donor compound such as Sulfasan DTDM supplied by Harwick Chemicals, or its equivalents.

A-3 can be metal oxides or metal organic salts. For example, zinc oxide is commonly used as activator during sulfur vulcanization reaction with unsaturated rubber. Magnesium oxide or other metal oxides are sometimes used. The metal oxides can be totally or partially replaced with their metallic salts such as zinc stearate, etc.

A-4 comprises accelerators for speeding up the sulfur vulcanization reaction and allowing the reaction to complete either at a lower temperature or in a shorter time. Commonly used accelerators include thiurams such as tetramethylthiuram disulfide, tetrabutylthiruram disulfide, tetraisobutylthiuram disulfide, tetrabenzylthiuram disulfide, tetraalkylthiuram disulfide, 2-mercaptobenzothiazole, benzothiazyl disulfide, N-oxydiethylenebenzothiazole-2sulfenamide, N-cyclohexyl-benzothiazole-2-sulfenamide, N-tert-butyl-2benzothiazolesulfenamide, diphenylguanidine, N,N'-ditolylguanidine, aldehyde-aniline condensation products, bismuth dimethyldithiocarbamate, cadmium dimethyldithiocarbamate, cadmium diethyldithiocarbamate, copper dimethyldithiocarbamate, lead dimethyldithiocarbamate, selenium dimethldithiocarbamate, selenium diethyldithiocarbamate, tellurium dimethyldithiocarbamate, zinc dimethyldithiocarbamate, zinc diethyldithiocarbamate, zinc di-n-butyldithiocarbamate, zinc diamyldithiocarbamate, thiodiazine, diethylthiourea, trimethylthiourea, dibuylthiourea, zinc isopropyl xanthate, etc.

A-5 is carbon black used for color, enforcement or to impart thermal or electrical conductivity to the ebonite vulcanizates.

A-6 comprises pigments or fillers that can be added to the mixture: fly ash, pumice, calcium carbonate, titanium dioxide, precipitated silica, fused silica, quartz, silicates, barium sulfide, talc, aluminum oxide, clay, iron oxide, micaceous iron oxide, glass flake, zinc sulfide, felspar, wallastonite, mica, grounded rubber particles, zinc borate, etc.

A-7 comprises additives that can be incorporated into the mixture, including thixotropic agents, deaerating agents, defoaming agents, leveling agents, adhesion promoters, surfactants, dispersing agents, anti-settling agents, fungicides, corrosion inhibitors, colorants, etc. Optionally, some inorganic moisture scavenger such as zeolites can also be added.

A-8 is an optional crosslinker that can react with A-1 and gel the mixture at ambient condition. This is often necessary to render the coating tack free for easy handling of coated parts or for facilitating the second coat. The optional crosslinker contains at least two functional groups in a molecule that can react with the functional groups in A-1. For example, if A-1 contains hydroxyl groups, A-8 can be any diisocyanate or triisocyanate monomers such as methylene diphenyl diisocyanate (MDI), Isonate 143L supplied by Dow Chemicals, or it can be an unsaturated liquid rubber which contains no less than two isocyanate functional groups. The stoichiometry of A-1 and A-8 is approximately 1 to 1. Those skill in the arts will have no problem choosing a suitable crosslinker based on the selection of A-1 and deciding on the amount of A-8 to adequately crosslink A-1.

The reaction rate or gel time of A-1 with A-8 must be carefully adjusted so that the mixture gels and becomes tack free within a desirable time period such as within 8 hours, but at the same time there must be a minimum pot life within which a coating applicator can mix all parts together without significant viscosity build-up so that the coating can be applied easily onto the substrate by trowelling, rolling, brushing or spraying. The required pot life is highly dependent on the application method and equipment used, typically ranging from about 5 to 240 minutes.

A-8 can be added at the end of mixing A-1 to A-7 of Part A. Alternatively, it can be left out from Part A, and be added after Part A and Part B are mixed. Optionally, a catalyst can be added to adjust the reaction to achieve the desired pot life and gel time.

B-1 epoxy resin can be any bisphenol A diglycidyl ether, bisphenol F diglycidyl ether, phenolic epoxy, phenol novolac epoxy, cresol novolac epoxy, tris(hydroxylphenyl) methane triglycidylether, triglycidyl p-aminophenol, tetraglycidyl amine of methylenedianiline, 1,3,5-tris(2,3-epoxypropyl)-1,3,5-perhydrotriazine-2,4,6-trione (triglycidyl isocyanurate), polyglycidylether of poly(4-hydroxylstyrene), etc. It is preferable that B-1 be in a liquid form. If it is in solid form, a suitable solvent may be added to prepare a liquid solution. It is also understood that B-1 can be a mixture of various epoxy resins mentioned above.

B-2 can be precipitated silica, fumed silica or fused silica.

B-3 can be inorganic thixotropic agent such as fumed silica, bentonites or organic thixotropic agents such as BYK 405 or BYK 410 supplied by BYK Chemie.

B-4 comprises similar materials as A-6. Part A and Part B can have the same or different fillers.

B-5 comprises similar materials as A-5. Part A and Part B can have the same or different additives.

B-6 is a curing agent for epoxy resin. The curing agents can include aliphatic amines, amidoamines, cycloaliphatic amines, aromatic amines, anhydrides, etc. A description of various curing agents can be found in the above-referenced "Corrosion Prevention by Protective Coatings," Chapter 5, Second Edition, by Charles Munger, published by NACE. It is also understood that B-6 can be a mixture of various curing agents listed above, so long as they are physically and chemically compatible.

Specific embodiments of the present invention are described in details below by way of examples and comparative examples.

EXAMPLE 1

Example 1 shows a blending of an ebonite composition and an epoxy composition at a ratio of 10/90 by mass, according to the present invention. The effect of the blending is compared with a control composition consisting of 100% epoxy. The epoxy is cured by an aromatic amine(Aradur 976-1).

| Part A: Liquid ebonite composition | | | |
|---|---|---|---|
| Ingredient | | Description | Mass % |
| A-1 | Polybd 600E | Epoxidized liquid polybutadiene (Atofina) | 63.88 |
| A-2 | Redball superfine | Sulfur (International Sulfur) | 22.36 |
| A-3 | Kadox 930 | Zinc oxide (Zinc Co. of America) | 6.85 |
| A-4 | Vanax DPG | Accelerator (R. T. Vanderbilt) | 1.92 |
| A-5 | Vulcan XC-72R | Carbon black (Cabot Co.) | 4.47 |
| A-7 | Tego Glide B1484 | Surface modifier (Tego Chemie) | 0.26 |
| A-7 | Tego Airex 910 | Air release agent | 0.26 |
| | | Total | 100.00 |

| Part B: Liquid epoxy composition | | | |
|---|---|---|---|
| Ingredient | | Description | Mass % |
| B-1 | Epalloy 8230 | Novolac epoxy (CVC chemical) | 59.3 |
| B-2 | HiSil 233 | Precipitated silica (PPG) | 16.6 |
| B-3 | Aerosil R972 | Fumed silica (Degussa) | 2.0 |
| B-4 | Red iron oxide | Pigment (Fisher Scientifc) | 0.4 |
| B-5 | Aradur 976-1 | Curing agent (Vantico) | 21.7 |
| | | Total | 100.0 |

Part A and Part B were mixed with the mass ratio of 10 to 90. A control composition consisting of 100% Part B was also prepared for comparison.

First, for each material, a coating with 20 mils thickness was prepared by using a doctor blade onto a ⅛" steel plate which was sand blasted to near white metal with 2 mils profile according to NACE#2 surface preparation standard. Both coated samples were baked in an air-circulated oven at 175° C. for 4 hours and 120° C. for 24 hrs at the same time. Pull-off adhesion was conducted according to ASTM D4541 at 23° C. With the blend the pull-out stress was 3500 psi, compared to the 1700 psi obtained with the control composition.

Second, also for each material, a coating with 20 mils thickness was prepared by using a doctor blade onto a standardized steel panel (Q-Panel) without sand blasting. Again, both coated samples were baked in an air-circulated oven at 175° C. for 4 hours and 120° C. for 24 hrs at the same time. The coated samples were scribed to the steel surface with an X mark and subjected to outdoor weathering with salt spray test with periodic spray of salt solution according to ASTM D6675 to test the resistance to undercut corrosion. After 6 weeks, the control showed 35 mm of corrosion ingress at the interface, while the blend prepared according to the present embodiment only showed 7 mm of corrosion ingress.

This demonstrated that the blending of 10% ebonite into an epoxy composition significantly increased the adhesion to steel and the resistance to undercut corrosion of an aromatic amine cured epoxy.

COMPARATIVE EXAMPLE 1A

Comparative Example 1A provides evidence that the significant improvement in adhesion and undercut corrosion resistance described in Example 1 is not caused solely by mixing only a compatible liquid rubber into an epoxy composition mentioned in some prior art. Comparative example 1A was prepared by blending epoxidized liquid rubber (ingredient A-1) alone with Part B at the weight corresponding to the epoxy-ebonite blend in Example 1.

Samples from this material were prepared the same way and cured at the same conditions as described in Example 1. Pull-off adhesion and Outdoor weathering with salt spray test was conducted as described in Example 1. With the PolyBD blended into Part B the pull-out stress was 1200 psi, compared to the 1700 psi obtained with the control 100% Part B. Outdoor weathering with salt spray test of this material showed 70 mm of undercut corrosion, while the control showed 35 mm of undercut corrosion.

This demonstrated that adding epoxidized liquid rubber alone, without the rest of ebonite composition ingredients, is not the cause of twice as high adhesion measured by pull-out stress test, neither the cause of significant improvement in undercut corrosion resistance reported in Example 1.

COMPARATIVE EXAMPLE 1B

Comparative Example 1B provides evidence that the significant improvement in adhesion and undercut corrosion resistance described in Example 1 is not caused solely by the addition of sulfur, as mentioned in U.S. Pat. No. 4,389,501.

Comparative example 1B was prepared by adding sulfur (ingredient A-2) alone into Part B, using a high speed disperser, at the weight corresponding to the epoxy-ebonite blend in Example 1. Samples from this material were prepared by the same way and cured at the same conditions as described in Example 1. Pull-off adhesion and outdoor weathering with salt spray test was conducted as described in Example 1. With only the sulfur dispersed into Part B the pull-out stress was also 1200 psi, compared to the 1700 psi obtained with the control of 100% Part B. Outdoor weathering with salt spray test showed 55 mm of undercut corrosion, while the control only showed 35 mm of undercut corrosion.

Again, this demonstrated that adding sulfur alone, without rest of ebonite composition ingredients, is insufficient in improving the adhesion strength or the undercut corrosion resistance reported in Example 1.

COMPARATIVE EXAMPLE 1C

The Comparative Example 1C examined the effect of the compatibility between liquid rubber and epoxy resin. The ebonite composition (Part A) in the Comparative Example 1C is the same as that in the Example 1, except that a non-epoxidized liquid rubber, Polybd 45HTLO, was used in the formulation to replace Polybd 600E, which is epoxidized.

Comparative example 1C was prepared by mixing the non-epoxidized liquid rubber based ebonite composition and Part B with the mass ratio of 10 to 90. It was observed that the mixture showed some phase separation.

Samples were prepared and tested at the identical way as described in Example 1 and compared with the same control which is 100% Part B. With the blend of non-epoxidized rubber based ebonite formulation the pull-out stress was 1500 psi, compared to the 3500 psi obtained with the epoxidized rubber based ebonite formulation, both compared to the 1700 psi obtained with the control.

On the other hand, outdoor weathering with salt spray test indicates that complete ebonite formulation even with non-epoxidized liquid rubber as a base, can still improve the undercut corrosion protection of the liquid epoxy composition. Outdoor weathering with salt spray test showed 3 mm of undercut corrosion compared to the 7 mm obtained with the epoxidized rubber based ebonite formulation, while control showed 35 mm undercut corrosion.

Thus, it showed that using a less compatible liquid rubber in the ebonite component is still effective in improving undercut corrosion, but is ineffective in increasing pull-out adhesion strength.

EXAMPLE 2

Example 2 shows another blending of an ebonite composition and an epoxy composition at a ratio of 10/90 by mass, according to the present invention. The effect of the blending is compared with a control composition consisting of 100% epoxy. The epoxy is cured by an aliphatic amine (Ancamine 2432).

| Part A: Same as Example 1 | | |
|---|---|---|
| Part B: | | |
| Ingredient | Description | Mass % |
| B-1 Epalloy 8230 | Novolac epoxy (CVC-Specialty Chemicals) | 42.3 |
| B-2 Nubiefer EF MIO | Micaceous iron oxide (Nubiola) | 10.5 |
| B-3 RCF-015 | Glass flake (NGF-Canada) | 25.3 |
| B-4 Ancamine 2432 | Curing agent (Air Products) | 21.9 |
| | Total | 100.0 |

Part A and Part B were mixed with the mass ratio of 10 to 90. A control using 100% Part B was also prepared for comparison.

First, for each material, a coating with 20 mils thickness was prepared by using a doctor blade onto a ⅛" steel plate which was sand blasted to near white metal with 2 mils profile according to NACE#2 surface preparation standard. Both coated samples were baked at the same time in a air-circulated oven at 180° C. for one hour. Pull-off adhesion was conducted according to ASTM D4541 at 23° C. With the blend the pull-out stress was 2600 psi, compared to the 1400 psi obtained with the control.

Second, also for each material, a coating with 20 mils thickness was prepared by using a doctor blade onto a standardized steel panel (Q-Panel) without sand blasting. Again, both coated samples were baked in an air-circulated oven at 180° C. for one hour at the same time. The coated samples were scribed to the steel surface with an X mark and subjected to outdoor weathering with salt spray test with periodic spray of salt solution according to ASTM D6675 to test the resistance to undercut corrosion. After six weeks, the control was significantly delaminated at the interface with corrosion ingress 25 mm, while the blend according to this invention only showed 3 mm of corrosion ingress.

The Example 2 thus demonstrated that the addition of 10% ebonite to also significantly increased the pull-off adhesion and undercut corrosion of an aliphatic amine cured epoxy.

COMPARATIVE EXAMPLE 2A

Comparative example 2A a was prepared by blending epoxidized liquid rubber (ingredient A-1) alone with Part B given in Example 2 at the weight corresponding to the epoxy-ebonite blend in Example 2.

Samples from this material were prepared by the same way and cured at the same conditions as described in Example 2. Pull-off adhesion and Outdoor weathering with salt spray test was conducted as described in Example 2. With the Polybd blended into Part B the pull-out stress was 1200 psi, compared to the 1400 psi obtained with the control with 100% Part B.

Outdoor weathering with salt spray test showed 85 mm of corrosion ingress, while the blend according to this invention only show 3 mm of corrosion ingress.

Once again it was confirmed that modification by liquid rubber alone, without the rest of liquid ebonite formulation ingredients, is not a cause of tremendous and significant improvement of corrosion protection reported in Example 2.

COMPARATIVE EXAMPLE 2B

Comparative example 2B was prepared by mixing sulfur (ingredient A-2) alone into Part B given in Example 2 at the weight corresponding to the epoxy-ebonite blend in Example 2.

Samples from this material were prepared by identical way and cured at the same conditions as described in Example 2. Pull-off adhesion and outdoor weathering with salt spray test was conducted as described in Example 2. With the sulfur dispersed into Part B the pull-out stress was 2500 psi, compared to the 1400 psi obtained with the control. Even though that there was a significant increase in pull-off stress value detected the outdoor weathering with salt spray test showed catastrophic total delamination of sulfur modified Part B. Outdoor weathering with salt spray test showed 85 mm of corrosion ingress, compared with 25 mm ingress of the control and 3 mm ingress reported in Example 2.

Again, it showed that mixing sulfur alone can improve pull-off adhesion strength, but not undercut corrosion of an epoxy cured by aliphatic amine.

COMPARATIVE EXAMPLE 2C

Comparative Example 2C illustrates the importance of high temperature bake of the epoxy-ebonite blends. Epoxy-ebonite blend described in Example 2 was cured at ambient temperature for 7 days instead of high temperature bake at 180° C. for one hour.

With the ambient temperature cured blend, the pull-off stress was only 900 psi as compared to 2600 psi obtained with high temperature bake. Outdoor weathering with salt spray test with salt spray showed 85 mm of corrosion ingress in the case of ambient temperature cured versus 3 mm of corrosion ingress of high temperature bake.

It thus demonstrated that the high temperature bake is necessary to achieve either increased adhesion strength or resistance to undercut corrosion.

EXAMPLE 3

In Example 3, Part A and Part B are the same as those in Example 1, but the mix ratio is 50/50 by mass. With the blend prepared in the mix ratio 50/50 by mass the pull-off stress was 1600 psi as compared to 1700 psi obtained with control. Outdoor weathering with salt spray test showed 9 mm of corrosion ingress, while the control showed 35 mm of corrosion ingress. It demonstrated that the addition of 50% ebonite still enhanced the resistance to undercut corrosion for the aromatic amine cured epoxy.

EXAMPLE 4

In Example 4, Part A and Part B, and the procedure for sample preparation are the same as those in Example 1, but the mix ratio is 80/20. With the blend prepared in the mix ratio 80/20 by mass the pull-out stress was 900 psi as compared to 1700 psi obtained with control.

Outdoor weathering with salt spray test showed 3 mm of corrosion ingress, whereas the control (100% Part B) showed 35 mm of corrosion ingress

EXAMPLE 5

In Example 5, Part A and Part B, and the procedure for sample preparation are the same as those in Example 2, but the mix ratio is 50/50 by mass. With the blend prepared in the mix ratio 50/50 by mass the pull-off stress was 1800 psi as compared to 1400 psi obtained with control. Outdoor weathering with salt spray test showed 10 mm of corrosion ingress, but the control show 25 mm of corrosion ingress. It demonstrated that the addition of 50% ebonite still enhanced the resistance to undercut corrosion for the aliphatic amine cured epoxy.

Although the present invention and its advantages have been described in detail, it should be understood that the present invention is not limited to or defined by what is shown or discussed herein. The tables, description, and discussion herein illustrate technologies related to the invention, show examples of the invention and provide examples of using the invention. Known methods, procedures, systems, elements, or components may be discussed without giving details, so to avoid obscuring the principles of the invention. One skilled in the art will realize that implementations of the present invention could be made without departing from the principles, spirit, or legal scope of the present invention. Accordingly, the scope of the invention should be determined by the following claims and their legal equivalents.

We claim:

1. An epoxy-ebonite composition useful for protecting metal from undercut corrosion or chemical attack, said epoxy ebonite composition comprising:
    a mixture of epoxy/ebonite in a ratio of 95/5 to 5/95 by mass, wherein said epoxy is characterized as a high bake epoxy composition comprising an epoxy resin and an epoxy curing agent, and wherein said ebonite is characterized as a liquid composition comprising
        a liquid rubber, wherein mass parts of said liquid rubber is about 15–85, and wherein said liquid rubber comprises
            a compatible liquid unsaturated rubber encompassing more than 50 per cent of said liquid rubber;
            a non-compatible liquid unsaturated rubber; and
            a liquid saturated rubber encompassing less than 10 per cent of said liquid rubber;
        a sulfur vulcanization agent, wherein mass parts of said sulfur vulcanization agent is about 10–50;
        a vulcanization accelerator, wherein mass parts of said vulcanization accelerator is about 0.2–5;
        and a vulcanization activator, wherein mass parts of said vulcanization activator is about 1–35.

2. An epoxy-ebonite composition useful for protecting metal from undercut corrosion or chemical attack, said epoxy ebonite composition comprising:
    a mixture of epoxy/ebonite in a ratio of 95/5 to 5/95 by mass, wherein said epoxy is characterized as a high bake epoxy composition comprising an epoxy resin and an epoxy curing agent, and wherein said ebonite is characterized as a liquid composition comprising
        a liquid rubber, wherein said liquid rubber contains at least 50 per cent by mass of an unsaturated liquid rubber that is substantially compatible with said epoxy resin, and wherein said substantially compatible unsaturated liquid rubber is selected from the group consisting of epoxidized liquid rubber, nitrile rubber, maleinized liquid rubber, acrylic functional liquid rubber, and chloroprene rubber;
        a sufur vulcanization agent;
        a vulcanization accelerator; and
        a vulcanization activator.

3. An epoxy-ebonite composition useful for protecting metal from undercut corrosion or chemical attack, said epoxy ebonite composition comprising:
    a mixture of epoxy/ebonite in a ratio of 95/5 to 5/95 by mass, wherein said epoxy is characterized as a high bake epoxy composition comprising an epoxy resin and an epoxy curing agent, and wherein said ebonite is characterized as a liquid composition comprising
        a liquid rubber, wherein said liquid rubber comprises a reactive functional group;
        a sufur vulcanization agent;
        a vulcanization accelerator; and
        a vulcanization activator.

4. The epoxy-ebonite composition according to claim 3, wherein said reactive functional group is selected from the group consisting of hydroxyl, isocyanate, epoxy, amine, maleic anydirde, and carboxylic acid.

5. An epoxy-ebonite composition useful for protecting metal from undercut corrosion or chemical attack, said epoxy ebonite composition comprising:
    a mixture of epoxy/ebonite in a ratio of 95/5 to 5/95 by mass, wherein said epoxy is characterized as a high bake epoxy composition comprising
        an epoxy resin, wherein said epoxy resin is selected from the group consisting of bisphenol A diglycidyl ether, bisphenol F diglycidyl ether, phenolic epoxy, phenol novolac epoxy, cresol novolac epoxy, tris (hydroxylphenyl) methane triglycidylether, triglycidyl p-aminophenol, tetraglycidyl amine of methylenedianiline, 1,3,5-tris(2,3-epoxypropyl)-1,3,5-perhydrotriazine-2,4,6-trione (triglycidyl isocyanurate), and polyglycidylether of poly(4-hydroxyistyrene); and
        an epoxy curing agent;
    and wherein said ebonite is characterized as a liquid ebonite composition comprising a liquid rubber, a sulfur vulcanization agent, a vulcanization accelerator, and a vulcanization activator.

* * * * *